(12) United States Patent
Hidaka

(10) Patent No.: US 7,581,438 B2
(45) Date of Patent: Sep. 1, 2009

(54) SURFACE TEXTURE MEASURING PROBE AND MICROSCOPE UTILIZING THE SAME

(75) Inventor: Kazuhiko Hidaka, Veenendaal (NL)

(73) Assignee: Mitutoyo Corporation, Kawasaki-shi (JP)

( * ) Notice: Subject to any disclaimer, the term of this patent is extended or adjusted under 35 U.S.C. 154(b) by 345 days.

(21) Appl. No.: 11/263,681

(22) Filed: Nov. 1, 2005

(65) Prior Publication Data

US 2006/0090550 A1 May 4, 2006

(30) Foreign Application Priority Data

Nov. 2, 2004 (JP) ............... 2004-319379

(51) Int. Cl.
G01B 5/281 (2006.01)
(52) U.S. Cl. ....................................... 73/105
(58) Field of Classification Search .................... 73/105
See application file for complete search history.

(56) References Cited

U.S. PATENT DOCUMENTS

| | | | | |
|---|---|---|---|---|
| 5,517,190 | A | * | 5/1996 | Gunn ................ 340/870.18 |
| 6,469,288 | B1 | | 10/2002 | Sasaki et al. |
| 2003/0066202 | A1 | * | 4/2003 | Eaton .................... 33/503 |
| 2005/0283990 | A1 | * | 12/2005 | McMurtry et al. ......... 33/556 |

FOREIGN PATENT DOCUMENTS

| | | |
|---|---|---|
| EP | 1055901 | 11/2000 |
| JP | 02-300709 | 12/1990 |
| JP | 05-045109 | 2/1993 |
| JP | 09-203864 | 8/1997 |
| JP | 09-243649 | 9/1997 |
| JP | 2001-165843 | 6/2001 |
| JP | 2001-264230 | 9/2001 |
| JP | 2003-344034 | 12/2003 |
| WO | 03/019238 | 3/2003 |

OTHER PUBLICATIONS

Naber A et al: "Dynamic force distance control suited to various probes for scanning near-field optical microscopy", Review of Scientific Instruments, American Institute of Physics, US, vol. 70, No. 10, Oct. 1999, pp. 3955-3961, XP012037130, ISSN: 0034-6748.

* cited by examiner

Primary Examiner—Robert R Raevis
(74) Attorney, Agent, or Firm—Rankin, Hill & Clark LLP

(57) ABSTRACT

A surface texture measuring probe (60) includes a probe head (65), a first supporting body (61), a second supporting body (62), a piezoelectric element (63) and a balancer (64). The first supporting body includes a first supporter (611) having an inner space, and a plurality of beams (613) respectively extending from equiangular arrangement positions of the first supporter toward the center and supporting the probe head (65) at the tip end thereof. The second supporting body (62) includes a second supporter (621) and a holder (622) supported by a plurality of beams (623) respectively extending from equiangular arrangement positions of the second supporter towards the center. The piezoelectric element (63) is disposed between the probe head and the holder, and formed to vibrate in an axial direction.

12 Claims, 5 Drawing Sheets

SURFACE TEXTURE MEASURING PROBE AND MICROSCOPE UTILIZING THE SAME

BACKGROUND OF THE INVENTION

1. Field of the Invention

The present invention relates to a surface texture measuring probe adaptable to a near-field scanning optical microscope (NSOM), an atomic force microscope (AFM) and a scanning tunneling microscope (STM), as well as a microscope utilizing the surface texture measuring probe.

2. Description of Related Art

An optical microscope has been known as an example of a near-field scanning optical microscope for measuring surface texture of a workpiece utilizing evanescent light (near-field light), which is disclosed in Document 1 (JP-A-2001-165843).

The optical microscope includes a light irradiator that irradiates light on a surface of a sample, a cantilever holding a probe, and an objective optical system that receives scattered light caused by incident light generated at a tip end of the probe. The cantilever is provided with a holder base, which is a fixed end, a probe holder arranged on the holder base to extend in one direction, and the probe disposed on a free end of the probe holder.

According to the above-described near-field scanning optical microscope, since the incident light incident on the surface of the sample is scattered by the extremely small probe and the scattered light is received and detected by the objective optical system, disturbance vibration likely affects on the probe, thus extremely deteriorating measurement accuracy.

To solve this, there is suggested a measuring method with the probe vibrated. However, since the cantilever structure anchored by the holder base as the fixed end is employed for the conventional probe, which causes flexural vibration, the natural frequency fc cannot be heightened. Generally, when the position of the probe etc. is controlled in accordance with the feedback fed by a sensor, if the control is based on the frequency higher than the natural frequency fc, the probe will be oscillated. This is because the phase is rapidly lagged due to the resonance frequency of the sensor as in physical background. Therefore, the conventional cantilever probe does not allow the response speed to be increased, so that the measurement may not be speeded up.

SUMMARY OF THE INVENTION

An object of the present invention is to provide a surface texture measuring probe allowing measurement to be speeded up while restraining disturbance vibration to enhance measuring accuracy, and a microscope utilizing the surface texture measuring probe.

A surface texture measuring probe according to an aspect of the invention utilized for a surface texture measuring instrument that measures surface texture of a workpiece while scanning along a surface of the workpiece, includes: a probe head; a first supporting body that supports the probe head; a second supporting body coupled to the first supporting body; and a vibration element disposed between the first and second supporting bodies. The first supporting body includes a first supporter having an inner space, and a plurality of beams respectively extending from equiangular arrangement positions of the first supporter toward the center and supporting the probe head at the center of the inner space of the first supporter. The second supporting body includes a second supporter coupled to the first supporter and having an inner space, a plurality of beams respectively extending from equiangular arrangement positions of the second supporter toward the center, and a holder supported at the center of the inner space of the second supporter via the plurality of beams. And, the vibration element is disposed between the probe head and the holder of the second supporting body and formed to vibrate in an axial direction of an axis penetrating through the center of the first and second supporting bodies.

For example, when a surface texture measuring probe is utilized for the near-field scanning optical microscope, the laser beam is irradiated on the tip end of the probe head, so that a near-field light is formed at the tip end. In this state, when the probe head is moved close to the workpiece, the near-field light formed at the tip end of the probe head is scattered by the workpiece, thereby detecting the scattered light by the detection element. By relatively moving the workpiece such that the probe head is relatively moved along the surface of the workpiece while the gap between the probe head and the workpiece is controlled such that the output from the detection element becomes the preset constant value, the surface texture (profile, waviness, roughness etc.) of the workpiece can be measured based on the control information.

With this configuration, in measurement, the vibration element is vibrated with the first and second supporters of the first and second supporting bodies fixed. As the vibration element vibrates, the probe head is vibrated in the axial direction. The probe head should be vibrated in the axial direction with the frequency lower than the natural frequency fc. Then, since the output signal with the same period as the vibration period of the probe head is output, the output signal is demodulated by a filter such as a Band-Pass Filter (BPF) or a Peak Hold (PH), and the feedback is provided to the actuator so that the demodulated signal becomes constant, thereby restraining the disturbance vibration.

And, since the probe head is supported at the center of the inner space of the first and second supporters via the each three beams respectively extending from the equiangular arrangement positions of the first and second supporters of the first and second supporting bodies toward the center, remarkably high frequency can be excited as compared to the ordinary cantilever probe. Accordingly, the vibration can be heightened, and therefore the measurement can be speeded up. To be more specific, when the position of the probe etc. is controlled according to the feedback from the sensor, the probe might be oscillated if the control is performed with the frequency equal to or higher than the natural frequency fc. However, with this configuration, the natural frequency fc can be heightened, thus realizing of heightening the vibration as well as speeding up the measurement.

Since the surface texture measuring probe has longitudinal vibration, the surface texture measuring probe will not affect on the optical property as compared to having of flexural vibration, namely, the optical axis will not be deviated due to the flexural vibration or the like, thus providing high accurate measurement. And, as shown in FIG. 3, the vibration mode is vertically symmetrical with the center being the node of vibration, so that the vibration can be restrained by the supporting bodies to function as a so-called dynamic vibration absorber.

Preferably, the above-described surface texture measuring probe may further includes: a balancer disposed on a surface of the second supporting body opposite to the vibration element, in which the balancer has a mass equal to that of the probe head.

With this configuration, since the both sides of the vibration element have the same structure and mass, the high-level and stable vibration can be excited.

Preferably, in the above-described surface texture measuring probe, the vibration element, the holder of the second supporting body and the balancer each may be formed in a ring-like shape, and the probe head may have an opening at the center thereof.

With this configuration, when the laser beam with the wavelength larger than the diameter of the opening is incident on the surface texture measuring probe, the laser beam passes through the ring-like arrangements of the balancer, the holder of the second supporting body and the vibration element, and reaches the probe head. However, since the wavelength of the laser beam is larger than the opening diameter of the probe head, the laser beam cannot pass through the opening of the probe head, and forms the near-field light at the vicinity of the opening. Accordingly, the above-described configuration can be utilized as a probe for the near-field scanning optical microscope that forms the near-field light at the opening of the probe head.

Preferably, in the above-described surface texture measuring probe, the probe head may have a conical tip end.

With this configuration, there can be provided a surface texture measuring probe adaptable to a near-field scanning optical microscope (NSOM), an atomic force microscope (AFM), a scanning tunneling microscope (STM) or the like.

When utilizing the configuration as a probe for the near-field scanning optical microscope, the near-field light can be formed at the needle-like tip end of the probe head if the light is irradiated on the tip end from the outside. When utilizing the configuration as a probe for the atomic force microscope, the displacement of the probe caused by the atomic force acting between the probe head and the workpiece is measured, and the relative distance between the probe head and the workpiece is controlled so that the displacement becomes constant. When utilizing the configuration as a probe for the scanning tunneling microscope, the tunnel current applied between the probe head and the workpiece is measured, and the relative distance (gap) between the probe head and the workpiece is controlled so that the tunnel current becomes constant.

A microscope according to another aspect of the invention utilizes the above-described surface texture measuring probe.

Here, a microscope may be a near-field scanning optical microscope (NSOM), an atomic force microscope (AFM) and a scanning tunneling microscope (STM). As in cases of these microscopes, the same advantages and effects can be expected.

DETAILED DESCRIPTION OF PREFERRED EMBODIMENT(S)

An embodiment of the present invention will be described below with reference to attached drawings.

Figure 1:
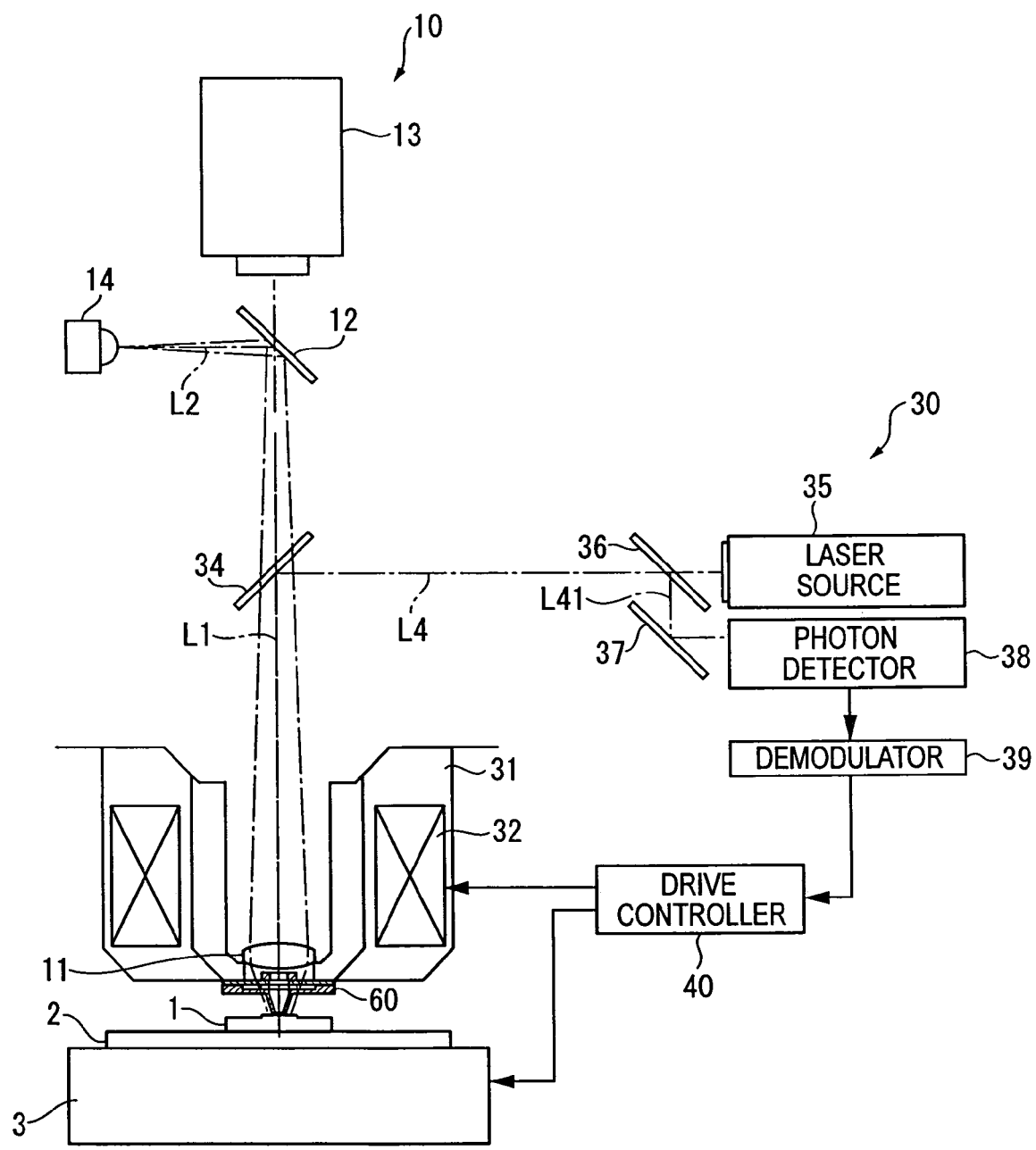
FIG. 1 is an illustration showing an optical microscope according to an embodiment of the present invention.

FIG. 1 shows a near-field scanning optical microscope (NSOM) of the present embodiment. The near-field scanning optical microscope includes a table 2 on which a workpiece 1 is mounted, a relative movement unit 3 that moves the table 2 three-dimensionally (in horizontal, longitudinal, and vertical directions), an optical observation unit 10 that images and observes the workpiece 1 with a camera etc., a near-field measuring unit 30, and a drive controller 40.

The optical observation unit 10 includes an objective lens 11, a half-mirror 12 arranged on an optical path L1 of the objective lens 11, a CCD camera 13 (image pickup unit) arranged on the optical path L1 of the objective lens 11 to image a light transmitted through the half-mirror 12 (a reflected light from the workpiece 1), and a light source 14 arranged on an optical axis L2 orthogonal to the optical axis L1 of the objective lens 11 to irradiate light toward the half-mirror 12.

The near-field measuring unit 30 includes an actuator 32 that displaces a holder 31 holding the objective lens 11 along the optical axis L1, a surface texture measuring probe 60 arranged integrally with the holder 31 and fixed near the objective lens 11, a half-mirror 34 arranged on the optical axis L1 of the objective lens 11, a laser source 35 arranged on an optical axis L4 orthogonal to the optical axis L1 of the objective lens 11, a half-mirror 36 arranged on the optical axis L4, a mirror 37 arranged on an optical axis L41 orthogonal to the optical axis L4 to reflect the reflected light from the half-mirror 36, a photon detector 38 (detection element) that receives the reflected light from the mirror 37, and a demodulator 39 that demodulates the output signal from the photon detector 38.

Figure 2:
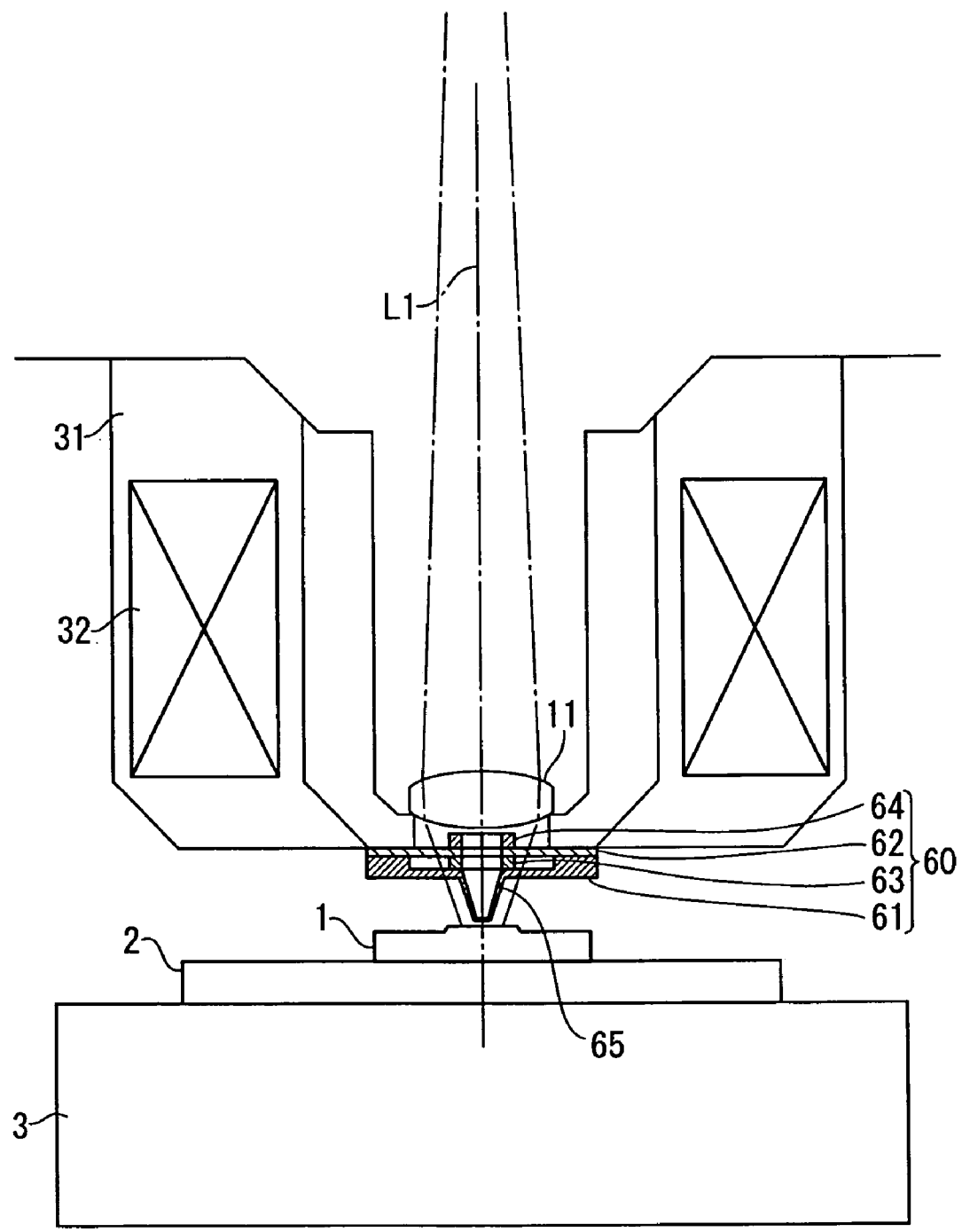
FIG. 2 is an enlarged view showing the primary portion of an optical microscope of the aforesaid embodiment.

As shown in FIG. 2, the surface texture measuring probe 60 includes a probe head 65, a first supporting body 61 that supports the probe head 65, a second supporting body 62 coupled to the first supporting body 61, a piezoelectric element 63 (vibration element) disposed between the first and second supporting bodies (61, 62), and a balancer 64 disposed on a surface of the second supporting body 62 opposite to the piezoelectric element 63.

Figure 3:
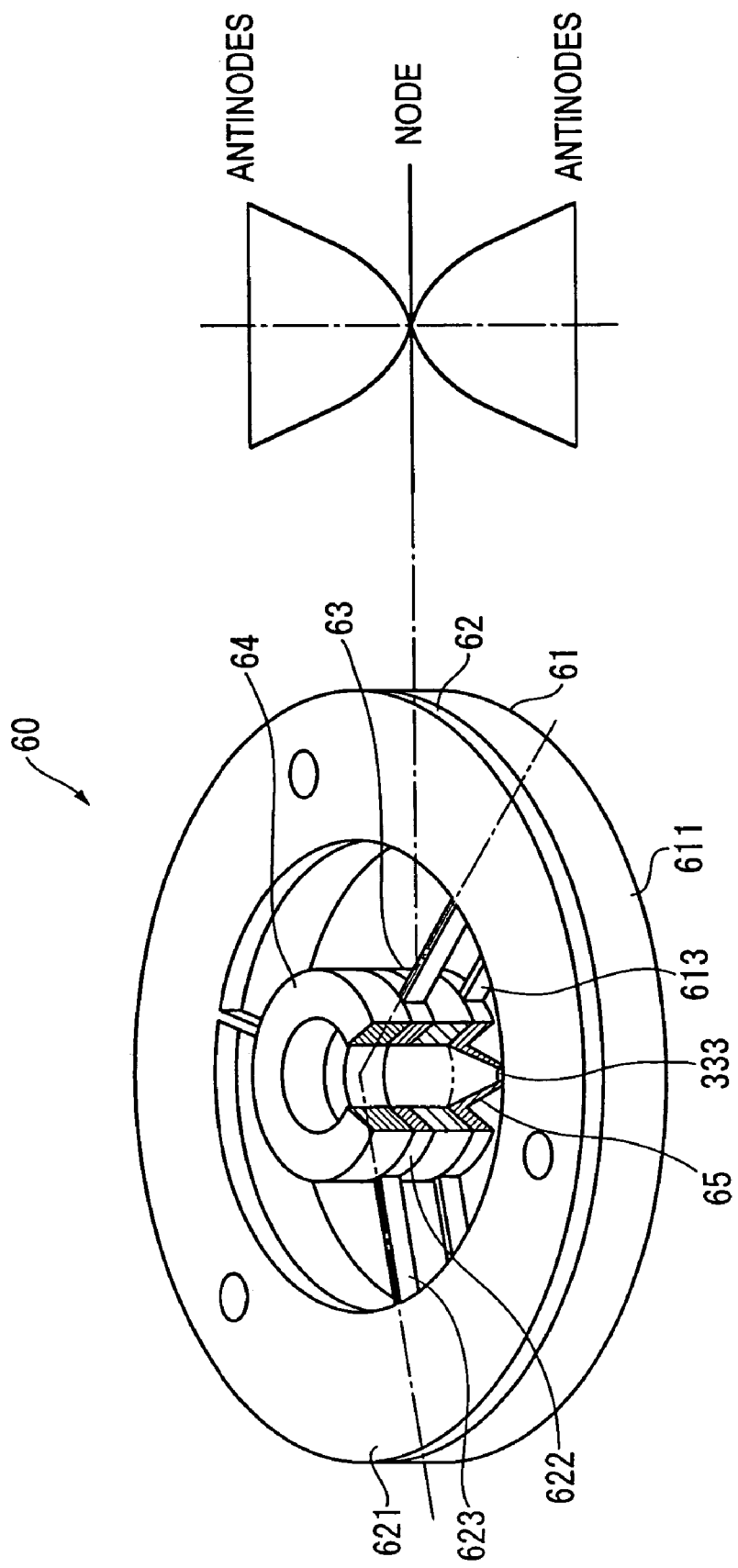
FIG. 3 is an illustration showing a surface texture measuring probe utilized by the optical microscope of the aforesaid embodiment.

As shown in FIG. 3, the probe head 65 is formed such that the inner diameter thereof is gradually tapered toward the opposite side of the piezoelectric element 63. An opening 333 is provided at the tip end of the probe head 65. The diameter of the opening 333 is formed smaller than wavelength λ1 of laser beam from the laser source 35. Here, since the wavelength λ1 of the laser beam from the laser source 35 is set to 633 nm (helium-neon laser), the diameter of the opening 333 is formed to be 500 nm. Therefore, the laser beam from the laser source 35 cannot pass through the opening 333 of the surface texture measuring probe 60, and thus forms near-field light at the vicinity of the opening 333. The near-field light provides significant effect within a sphere having the diameter about the diameter of the opening.

As shown in FIG. 3, the first supporting body 61 includes a ring-like first supporter 611 having a cylindrical space therein, and a plurality (three) of beams 613 respectively extending from equiangular arrangement positions (120 degree interval positions) of the first supporter 611 toward the center of the inner cylindrical space to support the probe head 65 at the center of the inner cylindrical space of the first supporter 611.

As shown in FIG. 3, the second supporting body 62 includes a ring-like second supporter 621 having a cylindrical space therein, a plurality (three) of beams 623 respectively extending from equiangular arrangement positions (120 degree interval positions) of the second supporter 621 toward the center of the inner cylindrical space, and a holder 622 supported at the center of the inner cylindrical space of the second supporter 621 via the plurality of beams 623.

Each of the beams 613, 623 are formed rectangular in cross section so that the dimension seen in observation direction with the CCD camera 13 is sufficiently small relative to the dimension along the optical axis L1 direction (the dimension in vibration direction). In other words, when being observed by the CCD camera 13, the beams 613, 623 each have cross section to be thin as possible but able to be vibrated at high frequency.

Incidentally, the beams 613, 623 may not be arranged in the 120 degree interval positions, and may be arranged in 180 degree interval positions with each two beams, in 90 degree interval positions with each four beams, or in smaller degree interval positions with each larger number of beams. The point is to meet the requirements that the beams can be vibrated at higher frequency than that of the conventional cantilever structure.

The piezoelectric element 63 is disposed between the probe head 65 and the holder 622 of the second supporting body 62, the piezoelectric element 63 being cylindrical centering on the axis penetrating through the center of the first and second supporting bodies 61, 62 and able to vibrate in the axial direction.

The balancer 64 is cylindrical and coaxially disposed relative to the axis of the piezoelectric element 63, of which mass is equal to that of the probe head 65.

The drive controller 40 controls the operation of the relative movement unit 3 to move the workpiece 1 such that the surface texture measuring probe 60 of the near-field measuring unit 30 is relatively moved along the surface of the workpiece 1, and also drive the actuator 32 such that the output from the demodulator 39 (the output of the photon detector 38) of the near-field measuring unit 30 becomes constant. Namely, the actuator 32 is driven such that the distance from the surface texture measuring probe 60 to the workpiece 1 becomes constant.

First in measurement, the portion of the workpiece 1 to be measured is roughly defined with the optical observation unit 10. The light from the light source 14 is irradiated on the workpiece 1 through the half-mirrors 12, 34 and objective lens 11, as well as through clearances of the beams 613, 623 of the surface texture measuring probe 60. While the reflected light is observed by the CCD camera 13, the portion of the workpiece 1 to be measured is roughly defined. At this time, since the surface texture measuring probe 60 is disposed close to the objective lens 11 and the beams 613, 623 of the surface texture measuring probe 60 each are formed thin when seen in the observation direction with the CCD camera 13, in observation with the CCD camera 13, the workpiece 1 can clearly be observed without difficulty to see the surface texture measuring probe 60 due to the disturbance of the beams 613, 623.

After the portion of the workpiece 1 to be measured is roughly defined by the CCD camera 13, the measurement is performed by the near-field measuring unit 30. When the laser beam from the laser source 35 (the laser beam with the wavelength λ1) passes through the half-mirrors 36, 34 and is input to the surface texture measuring probe 60, the laser beam forms the near-field light at the opening 333 in the tip end of the surface texture measuring probe 60.

Since the surface texture measuring probe 60 is moved close to the surface of the workpiece 1 by driving of the actuator 32, the near-field light formed at the tip end of the surface texture measuring probe 60 is scattered by the workpiece 1. Then, the near-field light becomes diffused light, and is detected by the photon detector 38 after passing through the objective lens 11, half-mirrors 34, 36 and being reflected by the mirror 37. That is, the scattered light of the near-field light is detected by the photon detector 38. The actuator 32 is driven until the output from the photon detector 38 becomes the preset constant value. In this state, the surface texture of the workpiece 1 is measured while the surface texture measuring probe 60 and the workpiece are relatively moved. Incidentally, in order to reduce reflection noise, a pin hole may be inserted at any location on the optical path between the laser source 35 and the objective lens 11.

This measurement is performed with the piezoelectric element 63 vibrated. As the piezoelectric element 63 is vibrated, the surface texture measuring probe 60 is vibrated in the axial direction. At this instant, the surface texture measuring probe 60 is vibrated at the frequency lower than the natural frequency fc. Then, the photon detector 38 outputs the output signal with the same vibration period of the surface texture measuring probe 60. The output signal is demodulated by the demodulator 39 and input to the drive controller 40.

The drive controller 40 controls the operation of the relative movement unit 3 to move the workpiece 1 such that the surface texture measuring probe 60 is relatively moved along the surface of the workpiece 1, and also drive the actuator 32 such that the output of the demodulator 39 (the output of the photon detector 38) of the near-field measuring unit 30 becomes constant.

As a result, when the relative movement position along the surface of the workpiece 1 due to the relative movement unit 3 is obtained and the moving amount of the surface texture measuring probe 60 due to the actuator 32 is obtained, the surface texture of the workpiece 1 can be obtained according to the two pieces of information.

According to the first embodiment, following advantages can be expected.

(1) While the surface texture measuring probe 60 is vibrated with the frequency lower than the natural frequency fc, the output from the photon detector 38 is demodulated by the demodulator 39, and the driving of the actuator 32 is controlled so that the demodulated output becomes constant. Accordingly, the disturbance vibration can be restrained.

(2) Since the probe head 65 is supported at the center of the inner space of the first and second supporters 611, 621 via the each three beams 613, 623 respectively extending from the equiangular arrangement positions of the first and second supporters 611, 621 of the first and second supporting bodies 61, 62, remarkably high frequency can be excited as compared to the ordinary cantilever probe. Namely, the vibration can be heightened, and therefore the measurement can be speeded up.

(3) Since the surface texture measuring probe 60 has longitudinal vibration, the surface texture measuring probe 60 will not affect on the optical property as compared to having of flexural vibration, thus providing high accurate measurement. And, as shown in FIG. 3, the vibration mode is vertically symmetrical with the center being the node of vibration, so that the vibration can be restrained by the supporting body 62 to function as a so-called dynamic vibration absorber.

The present invention is not limited to the above-described embodiments and includes modifications and rearrangements without departing from the spirit of the present invention.

Figure 4:
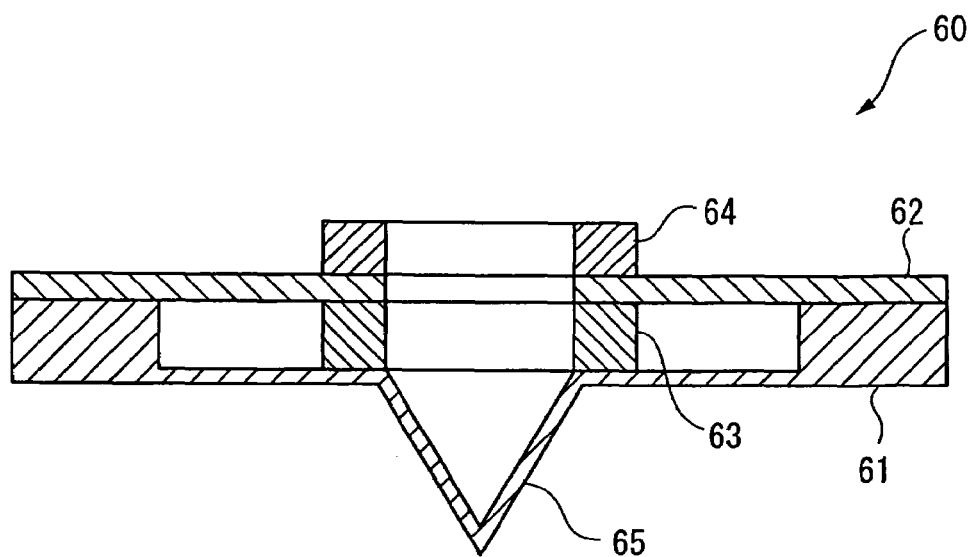
FIG. 4 is an illustration showing a surface texture measuring probe according to a modification of the present invention.

The surface texture measuring probe 60 is not limited to the structure of the above-described embodiment. For example, as shown in FIG. 4, the surface texture measuring probe 60 may not be provided with the opening 333. In other words, the surface texture measuring probe 60 may have a conical probe head 65. In this case, the near-field light can be formed at the needle-like tip end of the probe head 65 if the light is irradiated on the tip end from the outside.

Further, the structure of the surface texture measuring probe 60 shown in FIG. 4 may not be utilized for the near-field scanning optical microscope, and may be utilized for an atomic force microscope (AFM) or a scanning tunneling microscope (STM).

To be more specific, in a case of the atomic force microscope (AFM), while the workpiece is moved such that the surface texture measuring probe 60 is relatively moved along the surface of the workpiece, the displacement of the probe caused by the atomic force acting between the surface texture measuring probe 60 and the workpiece is measured, and the relative distance (gap) between the surface texture measuring probe 60 and the workpiece is controlled so that the displacement becomes constant. Accordingly, the surface texture of the workpiece can be measured based on the relative distance and the relative movement positions of the surface texture measuring probe 60 and the workpiece.

In the case of the scanning tunneling microscope (STM), while the workpiece is moved such that the surface texture measuring probe 60 is relatively moved along the surface of the workpiece, the tunnel current applied between the surface texture measuring probe 60 and the workpiece is measured, and the relative distance (gap) between the surface texture measuring probe 60 and the workpiece is controlled so that the tunnel current becomes constant. Accordingly, the surface texture of the workpiece can be measured based on the gap and relative movement positions of the surface texture measuring probe 60 and the workpiece. Note that, if surface texture measuring probe is utilized for the probe for the scanning tunneling microscope (STM), the surface texture measuring probe 60 and the workpiece must be formed by electrically conductive material in order to detect the tunnel current applied between the surface texture measuring probe 60 and the workpiece.

Figure 5:
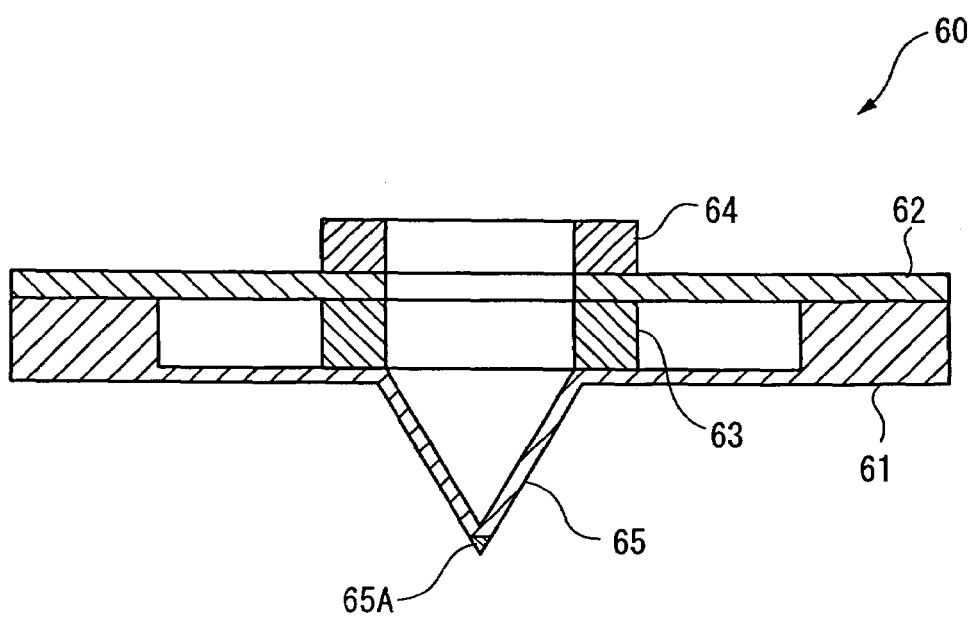
FIG. 5 is an illustration showing a surface texture measuring probe according to another modification of the present invention.
Figure 6:
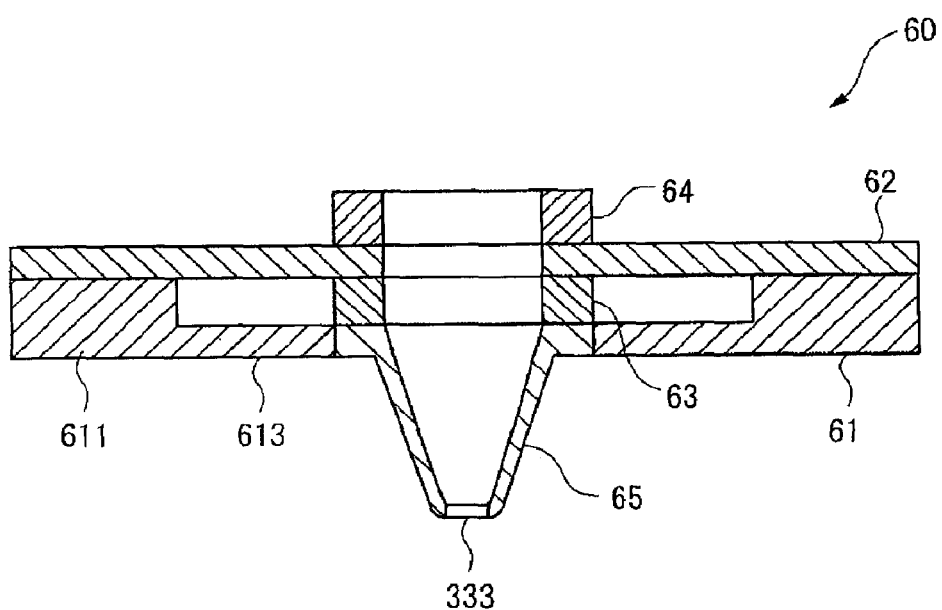
FIG. 6 is an illustration showing a surface texture measuring probe according to another modification of the present invention.

Incidentally, as shown in FIG. 5, the probe utilized for the scanning tunneling microscope (STM) or the atomic force microscope (AFM) employs a tip 65A of a probe head 65, which is made of silicon, tungsten, or platinum-iridium alloy. And, in the case of the surface texture measuring probe 60 utilized for the atomic force microscope (AFM), the probe employs a tip 65A of the probe head 65, which is made of silicon nitride, or silicon oxide.

As for the relative movement unit 3, as described in the embodiments, the table 2 may not be moved horizontally, longitudinally and vertically, and the surface texture measuring probe 60 may be moved horizontally and longitudinally.

Also in the case of the actuator 32, as stated in the above-described embodiments, the surface texture measuring probe 60 may not be moved vertically, and the table 2 may be moved vertically (in the direction close to/away from the surface texture measuring probe 60).

The priority application Number JP2004-319379 upon which this patent application is based is hereby incorporated by reference.

What is claimed is:

1. A surface texture measuring probe utilized for a surface texture measuring instrument that measures surface texture of a workpiece while scanning along a surface of the workpiece, comprising:
   a probe head;
   a first supporting body that supports the probe head;
   a second supporting body coupled to the first supporting body; and
   a vibration generating element disposed between the first and second supporting bodies, wherein
   the first supporting body includes a first supporter having an inner space, and a plurality of beams respectively extending from equiangular arrangement positions of the first supporter toward the center and supporting the probe head at the center of the inner space of the first supporter,
   the second supporting body includes a second supporter coupled to the first supporter and having an inner space, a plurality of beams respectively extending from equiangular arrangement positions of the second supporter toward the center, and a holder supported at the center of the inner space of the second supporter via the plurality of beams, and
   the vibration generating element is disposed between the probe head and the holder of the second supporting body and adapted to vibrate in an axial direction, the axial direction being a direction in which an axis penetrating through the centers of the first and second supporting bodies extends, the vibration of the vibration generating element causing the probe head to vibrate in the axial direction.

2. The surface texture measuring probe according to claim 1, further comprising:
   a balancer disposed on a surface of the second supporting body opposite to the vibration generating element, wherein
   the balancer has a mass equal to that of the probe head.

3. The surface texture measuring probe according to claim 2, wherein the vibration generating element, the holder of the second supporting body and the balancer are formed in a ring-like shape, and
   the probe head has an opening at the center thereof.

4. The surface texture measuring probe according to claim 2, wherein the probe head has a conical tip end.

5. The surface texture measuring probe according to claim 1, wherein the probe head has a conical tip end.

6. The surface texture measuring probe according to claim 1, wherein the vibration generating element is a piezoelectric element.

7. A microscope utilizing a surface texture measuring probe utilized for a surface texture measuring instrument that measures surface texture of a workpiece while scanning along a surface of the workpiece, wherein
   the surface texture measuring probe includes:
   a probe head;
   a first supporting body that supports the probe head;
   a second supporting body coupled to the first supporting body; and
   a vibration generating element disposed between the first and second supporting bodies,
   the first supporting body includes a first supporter having an inner space, and a plurality of beams respectively extending from equiangular arrangement positions of the first supporter toward the center and supporting the probe head at the center of the inner space of the first supporter, the second supporting body includes a second supporter coupled to the first supporter and having an inner space, a plurality of beams respectively extending from equiangular arrangement positions of the second supporter toward the center, and a holder supported at the center of the inner space of the second supporter via the plurality of beams, and the vibration generating element is disposed between the probe head and the holder of the second supporting body and adapted to vibrate in an axial direction, the axial direction being a direction in which an axis penetrating through the centers of the first and second supporting bodies extends, the vibration of the vibration generating element causing the probe head to vibrate in the axial direction.

8. The microscope according to claim 7, further comprising:

a balancer disposed on a surface of the second supporting body opposite to the vibration generating element, wherein the balancer has a mass equal to that of the probe head.

9. The microscope according to claim 8, wherein the vibration generating element, the holder of the second supporting body and the balancer are formed in a ring-like shape, and the probe head has an opening at the center thereof.

10. The microscope according to claim 8, wherein the probe head has a conical tip end.

11. The microscope according to claim 7, wherein the probe head has a conical tip end.

12. The microscope according to claim 7, wherein the vibration generating element is a piezoelectric element.

* * * * *